United States Patent
Roch

(10) Patent No.: US 7,252,466 B1
(45) Date of Patent: Aug. 7, 2007

(54) TOOL POSITION REFERENCING FOR CNC MACHINES

(76) Inventor: Gerald V. Roch, 2844 Jamieson La., Indianapolis, IN (US) 46268

( * ) Notice: Subject to any disclaimer, the term of this patent is extended or adjusted under 35 U.S.C. 154(b) by 0 days.

(21) Appl. No.: 11/531,064

(22) Filed: Sep. 12, 2006

(51) Int. Cl.
B23C 1/06 (2006.01)
B23Q 15/24 (2006.01)
B23Q 17/22 (2006.01)

(52) U.S. Cl. .................. 409/187; 409/218; 408/11; 408/12; 33/642; 33/638

(58) Field of Classification Search ........ 409/186–188, 409/193–195, 207–208, 210, 214, 218, 220; 408/8, 10–13, 16; 33/630, 632, 638, 640, 33/641–642; 451/5, 9, 8, 10
See application file for complete search history.

(56) References Cited

U.S. PATENT DOCUMENTS

| | | | |
|---|---|---|---|
| 2,738,692 A | 3/1956 | Jones | |
| 2,793,546 A | 5/1957 | Opel | |
| 2,982,185 A | 5/1961 | Engel | |
| 3,481,247 A * | 12/1969 | Hayes | 409/218 |
| 3,572,181 A | 3/1971 | Schlegel | |
| 3,614,909 A * | 10/1971 | Neuser | 409/218 |
| 3,945,297 A * | 3/1976 | Hohberger | 409/218 |
| 4,326,824 A | 4/1982 | Lasermann et al. | |
| 4,406,069 A * | 9/1983 | Clement | 33/642 |
| 4,407,614 A | 10/1983 | Muhr et al. | |
| 4,571,892 A | 2/1986 | Brill | |
| 4,725,172 A | 2/1988 | Shiina | |
| 4,826,370 A | 5/1989 | Conradsson | |
| 4,881,858 A | 11/1989 | Volk et al. | |

(Continued)

FOREIGN PATENT DOCUMENTS

FR 002679474 A1 1/1993

(Continued)

OTHER PUBLICATIONS

Renishaw PLC Apply Innovation, Technical Specifications H-2000-3020-06-A, pp. 2.3 and 4.2, date not provided.

(Continued)

*Primary Examiner*—Erica Cadugan
(74) *Attorney, Agent, or Firm*—Woodard, Emhardt, Moriarty, McNett & Henry LLP

(57) ABSTRACT

A CNC machining center has a table-mounted referencing device having two pedestals, each separately engageable by a tool in a Z-axis drive tool holder to establish a zero reference for vertical machining operations on a work-piece mounted on the table. The first of the pedestals has a relatively soft top so that rapid Z-axis advance of the tool onto the pedestal will not damage the tool tip. A spring load on the pedestal also accommodates limited downward movement from a rest position for the pedestal to operate a Z-axis drive stop switch to further avoid tool damage and to save in the computer controller memory, the height of the tool tip from the table. The second pedestal is provided with a hard top so that when the tool tip is touched on it and moves the hard pedestal to operate the switch 34, the Z-axis drive recorder records in controller memory a number that is precisely related to the height of the tool tip from the table.

10 Claims, 2 Drawing Sheets

U.S. PATENT DOCUMENTS

| | | | |
|---|---|---|---|
| 5,036,596 A | 8/1991 | Gyoury et al. | |
| 5,086,590 A | 2/1992 | Athanasiou | |
| 6,158,929 A | 12/2000 | Fisher | |
| 6,481,939 B1 | 11/2002 | Gillespie et al. | |
| 6,758,640 B2 | 7/2004 | Mizutani et al. | |

FOREIGN PATENT DOCUMENTS

| | | | |
|---|---|---|---|
| JP | 04035804 A | 2/1992 | |

OTHER PUBLICATIONS

J & L Industrial Supply Catalog (Southfield, MI), vol. 74, Electronic Edge Finders Section, date not provided.

Wholesale Tool Co., Inc. (Warren, MI), 2005 Wholesale Tool Catalog, p. 232.

MSC Indusrial Supply Co. (Melville, NY), 2001/2002 Catalog, p. 1666.

\* cited by examiner

TOOL POSITION REFERENCING FOR CNC MACHINES

BACKGROUND

This invention relates generally to manufacturing machines and particularly to those having a table for supporting a work-piece and having a spindle operable to move tools down and up for drilling, milling, grinding, boring, reaming or other means of treating the work-piece. Modern machine shops almost inevitably have a computer numerically-controlled (CNC) milling machine or a similar machine. Because of the cost of CNC machines, it is important for purchasers of such equipment to be as conservative as possible in regard to accessories or extra features which are available for such machines at extra cost.

One of the essential steps in a work-piece treating operation is to be able to relate the working part of a tool to a dimension to be achieved on a work-piece and to the Z axis travel of the tool holding portion of the machine. Also, it is essential to be establishing a reference of the tool relative to the work-piece without damage to either of them. The present invention is addressed to meet this need.

SUMMARY

According to one aspect of the present invention, a tool position referencing system is provided for adding onto a conventional manufacturing machine which has a holder for a work-piece and a holder for a work-piece treating tool, so that the tool can be moved rapidly downward for its tip to strike a first abutment without damage to the tool tip while registering the approximate vertical location of the tool tip, and then raised and shifted laterally and then moved downward slowly to make its tip strike a second abutment to accurately indicate the vertical location of the tool tip relative to the work-piece and the movement of the tool holding portion of the machine in the Z axis.

Another aspect is automatic stop of the rapid travel downward in response to the tool tip striking the first abutment.

Another aspect is accommodating downward movement of the second abutment in response to being struck by the tool tip and responding by stopping the downward travel.

Another aspect is to store and indicate the level of the first abutment when travel of the tool tip abutting the first abutment has been stopped automatically.

Another aspect is to store and indicate the level of the second abutment when travel of the tool tip abutting the second abutment has been stopped.

Another aspect is to provide a top surface of the first abutment which is soft enough to avoid damage to the tool tip upon striking the top surface.

Another aspect is to provide a top surface on the second abutment which is hard enough that the level of the tool tip is accurately indicated, without indenting the abutment or damaging the tool tip.

Another aspect is enablement of tooling in an automatic tool changer to be readily referenced to the work-piece.

DESCRIPTION OF THE ILLUSTRATED EMBODIMENT

Figure 1:
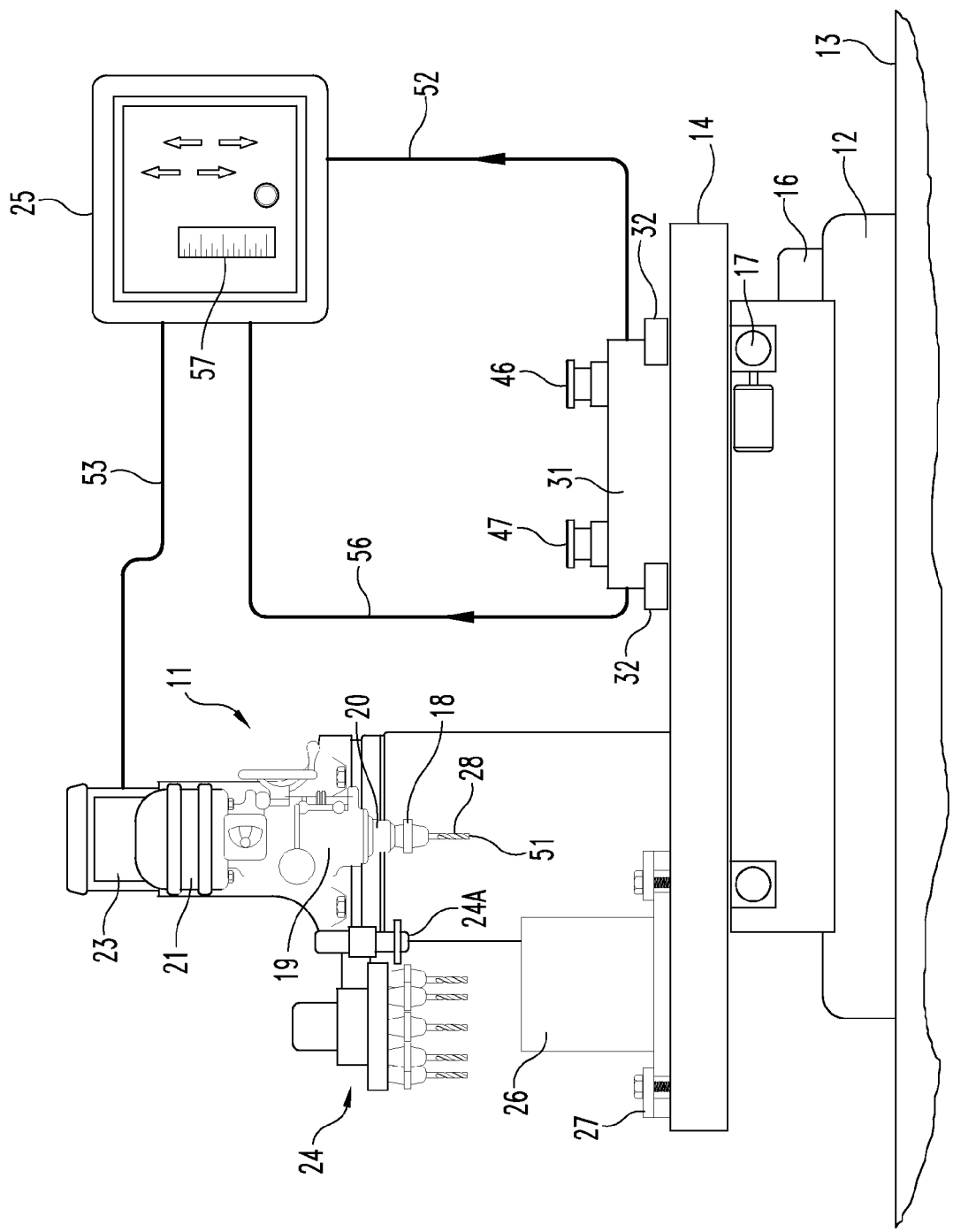
FIG. 1 is a schematic diagram of a CNC vertical machining center with automatic tool changer and with the tool referencing incorporated thereon according to an embodiment of the present invention.

Referring now to the drawings in detail, FIG. 1 shows schematically a conventional CNC vertical milling machine 11 which has a base 12 mounted on the floor 13. It is provided with a table 14 supported on X-axis slides 16, and Y-axis slides 17 for movement of the table horizontally to the left and right on the X-axis and forward and rearward on the Y-axis. A standard tool holder 18 with cutting tool fixed in it, is mounted to the end of a spindle 19 in a tool holder gripper 20 (which may be a chuck or socket or some other device) on the spindle. The spindle is rotated by a motor 21 which is mounted on a Z-axis slide driven by a Z-axis drive motor 23. An automatic tool changer 24 with associated tool magazine and tool changing swivel arm 24A is mounted on the machine for moving work-piece treatment tools mounted in standard tool holders, to and from the gripper 20. For the sake of an example, but without limitation, some work-piece treatment tools are drills, countersinks, counter-bores, taps, end mills, face mills, and reamers. A CNC controller 25 is mounted on the machine and is coupled to the X, Y, and Z-axis drives and to the spindle drive motor 21.

A work-piece 26 is clamped to the table 14 as by a vise 27 or otherwise secured to the table so that the work-piece would move only as the table is moved. Upon operator initiative, a tool in its holder in the tool changer magazine is selected and is automatically transferred to and secured in the gripper 20. After referencing this tool using the referencing device according to the illustrated embodiment of the invention, other tools can be selected and automatically transferred between the tool changer and the gripper and referenced and returned to the tool changer, ready to initiate work on a work-piece, without any further manual intervention by the tool operator.

Figure 2:
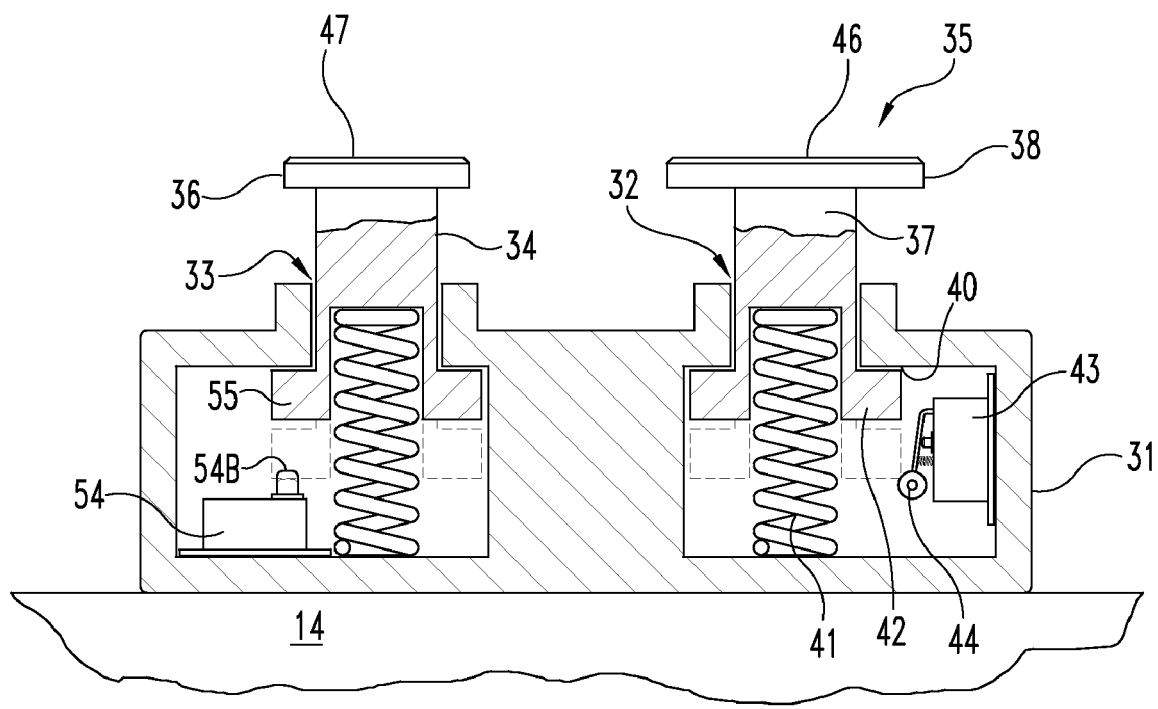
FIG. 2 is an enlarged schematic diagram showing mechanical features of the tool referencing device of FIG. 1.

The referencing system includes a referencing device having base 31 clamped as at 32 or otherwise fixed to the table 14. As better shown in FIG. 2, the base 31 has two sockets 32 and 33 in it. Each of these sockets receives a pedestal comprising a column such as 34 which is vertically slidable in and guided by the socket 33. A head is provided at the top of each column. For instance, pedestal 35 in socket 32 has the column 37 and head 38. Each of these pedestals has an internal spring such as 41 seated on the bottom on the socket and urging the pedestal upward until the stop flange 42 at the bottom of the pedestal column engages a step 40 at the socket wall, to limit the height to which the pedestal will be raised by the spring and stopped in a rest position. Also, each of these sockets has a position sensor switch associated with it such as switch 43 having a sensor 44 engaged by the bottom of the column 37 when the pedestal is moved down from its rest position. Various types of sensors switches may be used. For example and without limitation, a mechanical switch of the Micro-switch brand type, an optical switch, or a reed switch or a laser switch might be used. It is preferred that whatever is chosen, be such as to effect a change of state of the switch in response to depression of the pedestal with repeatability within 0.0005 inches (or better) of pedestal travel. Switch 43 is operatively (typically electrically) coupled to the controller 25, as indicated by the signal line 52. Power or signal cable 53 is provided from the controller 25 to the Z-axis drive.

A significant distinction between the two pedestal heads is that head 38 has a top surface 46 which is relatively soft and compliant such as hard rubber or plastic. In contrast, the top 47 of head 36 is hard, made of steel, for example. Accordingly, the top 46 of the first pedestal is compliant so that the tool 28 can be driven down rapidly by the Z-axis drive 23 in rapid advancement mode (750 inches per minute, for example) and the tool tip 51 can contact the pedestal top 46 without damage to the tool tip 51. The spring 41 enables the pedestal to have some downward travel at the rapid advance rate, and the switch 43 is operated by the descending pedestal and sends a signal on line 52 to the controller to shut off the Z-axis drive. At this point, the Z-axis drive distance register or encoder 57 tells the controller the approximate distance of the tool tip from the table top. Then the system software tells the Z-axis drive to raise the tool about one eighth inch above the soft pedestal top, which is followed by a horizontal move of the table to position the tool tip vertically above the hard pedestal. Initially, when the pedestals are in their rest stop positions shown in FIG. 2, the tops of both pedestals are at about the same level so there is no interference with this horizontal move. Then the Z-axis drive of the machine drives the tool downward at a slow rate and, as soon as the tool tip 51 touches the hard pedestal top 47 it moves the pedestal downward slightly against the spring load. This movement of the pedestal operates the switch 54. This switch is preferably of greater precision than switch 43 so it is shown with a button actuator 54B. When the flange 55 at the bottom of column 34 moves down, as shown by the dotted line in FIG. 2, it actuates switch 54. This sends a signal along line 56 to the controller and so the register or encoder 57 now has zero reference level information for the distance of the tool tip from the table top.

Since it is important for the machine to be able to relate, to the level of a reference point on the work-piece, the level of the tip of each different tool (regardless of its length) in a sequence of operations on the work-piece, it is convenient to relate the height of some reference point on the work-piece relative to the table top. This can be done by bringing the tool tip down very lightly ("touched off") onto the reference point (preferably on the top) on the work-piece and entering the tool tip level information at that point into the controller. Comparing this information with that previously provided upon the signal from switch 54, relates the work-piece reference point to the tool tip.

For each of the other tools to be used by this machine on the work-piece, the machine will automatically move the tool tip down onto the soft pedestal and then onto the hard pedestal to establish the offset for that tool, thus accommodating tools having different lengths from the tool holder to the tool tip or tips closest to the table. As used herein, the tool tip is the portion of the tool that is, measured on a vertical axis, farthest downward (measured axially of the machine spindle) from the spindle. For face mills or other large diameter tools, it is important to recognize the possibility that one of the multiple cutting edges might be slightly farther (measured axially) from the machine spindle than are the others. It is important in such cases, that the one that is farthest is the one considered as the distal end or tip for which the reference is made. For that purpose, in the use of the pedestal 36, it may be preferable to very slowly rotate the spindle in the reverse direction to engage each of the cutting points of the cutter with the top 47 of the pedestal 36 in sequence if the tool is larger than the top of the pedestal. Then, depending upon the acceptable tolerance for the desired dimension on the work-piece, reference can be made to that tip farthest downward from the spindle, or use an average of the distances of the remote tips cutter from the spindle. Also, depending upon the diameter of the path of the farthest downward edges, and the spacing between the tips, it can be necessary to establish a horizontal off-set of the center of such tool relative to the center of the pedestal top to be sure that at least one such tip rather than the space between two successive tips, is what is engaging the top of the pedestal when a measurement is being registered.

The spring load on the hard pedestal will enable the tool descending slowly, to move the pedestal down, and trip the sensor switch. The switch stops and reverses the Z-axis drive, permitting the hard pedestal to rise to its rest position where the stop flange at the bottom of its column engages the stop surface of the socket providing the rest position of the pedestal. With the level of the tool tip upon operation of sensor switch 54 stored in the controller memory, and the sensor trigger point distance from the table top known and stored in memory, the Z-axis drive of the machine can be provided with the desired known offset from the table top for all dimensions to be met as the tool tip does the necessary work on the work-piece. The same can be done for all of the other tools to be used on the work-piece.

With different work-pieces and different machine operator preferences, the work-piece might not be mounted directly on the table top. For example, and without limitation, it might be mounted on precision parallels on ways of a vise. If so, the operator might prefer to use a known relationship of a reference point on the vise to some reference point on the work-piece, to enter into the controller a known dimensional offset, and avoid a "touching off" step relative to the work-piece or the vise. The additional reference information relative to the various tool tips can be obtained with the referencing device as discussed above and entered in the controller in the same way as discussed above. The actuation of the switch 54 provides the zero reference in the part program for all of the tools in the tool changer that are to be used on the work-piece.

Because of the various signal inputs for various purposes on conventional CNC controls, the incorporation of this tool referencing device in a conventional CNC machine and the method provided for it is relatively easy to accomplish automatically, reliably and inexpensively. The software to be used to effect the above itemized steps may be provided by the CNC machine builder, to adapt the invention to the builders machines depending on the builder's preferences.

It will be evident that the base 31 of the referencing device be secured to the machine tool table 14. This can be done by clamps as at 32 (FIG. 1) or by bolts through the base into the table, or by other suitable means. Initially it is desirable to be able to use this device for referencing tools in the size from 0.030 inch diameter to 4 or 5 inch diameter cutters. For this purpose, the larger pedestal 38 may be 2.5 inches in diameter and the smaller pedestal 1.125 inches in diameter. These are simply examples. For the larger diameter tools within this range, appropriate off-sets may be provided to assure that at least two of the cutter edges will engage the top of the pedestal when referencing is done, to be sure that it is not a space between the cutting edges that is causing actuation of switch 54. To facilitate automating this referencing device, it is desirable that the machine tool set-up software be designed to incorporate the present referencing device in it.

The invention claimed is:

1. A tool position referencing apparatus for a machine having a powered spindle for holding a work-piece treating tool which has a proximal end and a distal end, and for activating the tool on a vertical axis, the apparatus comprising:

a base for fixing to a table on the machine;

a first pedestal mounted to said base for vertical movement relative to said base, and supported at a rest position by a resilient supporter;

a second pedestal mounted to said base for vertical movement relative to said base, and supported at a rest position by a resilient supporter;

a first sensor associated with said first pedestal and operable in response to vertical movement of said first pedestal downward from said rest position of said first pedestal;

a second sensor associated with said second pedestal and operable in response to vertical movement of said second pedestal downward from said rest position of said second pedestal;

a top on said first pedestal made of a compliant material such that, when the tool distal end is moving downward, said top is compliant in response to impact by said distal end against said compliant top, to operate said first sensor and to avoid damage to said tool distal end; and a top on said second pedestal made of a non-compliant material such that, when the tool distal end is moving downward, said second pedestal top is non-compliant in response to impact by said distal end against said non-compliant top, to operate said second sensor with greater accuracy than said first sensor operation.

2. The combination of claim 1 and further comprising:

a vertical feed drive for the spindle and coupled to said first sensor for termination of downward drive of the spindle in response to operation of said first sensor.

3. The combination of claim 1 and further comprising:

a register coupled to a spindle drive and to said first sensor for recording the level of the distal end of the tool in response to operation of said first sensor.

4. The combination of claim 3 and wherein:

said second sensor is coupled to said register for recording the level of the distal end of said tool in response to operation of said second sensor.

5. The combination of claim 4 and further comprising:

a computer coupled to said register for relating the distal end of said tool to a work-piece when the work-piece is fixed relative to said base.

6. The combination comprising:

a manufacturing machine which has a work-piece holding device with a known surface providing a reference plane;

a tool holder spaced above the reference plane and holding a work-piece treating tool having a distal end above the reference plane and powered for rotating the tool on a vertical axis;

a Z-axis drive on the machine for increasing and decreasing the vertical space between the distal end and the reference plane and the machine having drives for powered movement of said tool holder and said work-piece holding device relative to each other horizontally in X-axis and Y-axis directions;

a controller coupled to said drives;

zero referencing apparatus on said machine and comprising:

a base fixed relative to the work-piece holding device;

a first pedestal mounted to said base for vertical movement relative to said base, and supported at a rest position by a resilient supporter;

a second pedestal mounted to said base for vertical movement relative to said base, and supported at a rest position by a resilient supporter;

a first sensor associated with said first pedestal and operable in response to vertical movement of said first pedestal downward a distance from said rest position of said first pedestal to signal said controller;

a second sensor associated with said second pedestal and operable in response to movement of said second pedestal downward from said rest position of said second pedestal to signal said controller;

a top on said first pedestal and which is made of a compliant material so as to be compliant in response to impact by said treating tool distal end moving downward against said compliant top, to avoid damage to said end; and a top on said second pedestal and which is made of a non-compliant material so as to be non-compliant in response to impact by said treating tool distal end moving downward against said non-compliant top; and wherein said first sensor is coupled to said Z-axis drive to interrupt movement of said tool holder toward said reference plane by said Z-axis drive in response to operation of said first sensor.

7. The combination of claim 6 and further comprising:

a memory in said controller to store the level of said distal end relative to the level of said reference plane upon operation of said first sensor.

8. The combination of claim 7 and wherein:

said second sensor is coupled through said controller to said Z-axis drive to interrupt movement of said tool holder toward said reference plane by said Z-axis drive in response to operation of said second sensor, and to store in said memory the level of said distal end relative to said work-piece holding device upon operation of said second sensor.

9. The combination of claim 6 and wherein:

said first sensor is a first switch having a portion responsive to said first pedestal upon downward vertical movement of said first pedestal a first predetermined distance from said rest position of said first pedestal; and said second sensor is a second switch having a portion responsive to said second pedestal upon downward vertical movement of said second pedestal a second predetermined distance from said rest position of said second pedestal;

a signal line coupled to said first sensor for sending a signal to said Z-axis drive to stop movement of said tool toward said reference plane in response to movement of said first pedestal said first predetermined distance by said distal end of said tool; and means coupled to said second switch for sending a vertical height-indicating signal to a memory device in said controller upon response of said second switch portion to movement of said second pedestal said second predetermined distance, to establish a reference position of said distal end of said tool relative to said reference plane.

10. The combination of claim 6 and wherein:

said first sensor is a switch having a portion engaged by said first pedestal upon downward vertical movement of said first pedestal a first predetermined distance from said rest position of said first pedestal; and said second sensor is a second switch having a portion engaged by said second pedestal upon downward movement of said second pedestal a second predetermined distance from said rest position of said second pedestal.

* * * * *